(12) United States Patent
Tahara et al.

(10) Patent No.: US 11,164,701 B2
(45) Date of Patent: Nov. 2, 2021

(54) CERAMIC ELECTRONIC DEVICE AND MANUFACTURING METHOD OF CERAMIC ELECTRONIC DEVICE

(71) Applicant: TAIYO YUDEN CO., LTD., Tokyo (JP)

(72) Inventors: Mikio Tahara, Takasaki (JP); Tomoaki Nakamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 8 days.

(21) Appl. No.: 16/208,308

(22) Filed: Dec. 3, 2018

(65) Prior Publication Data

US 2019/0180938 A1 Jun. 13, 2019

(30) Foreign Application Priority Data

Dec. 8, 2017 (JP) .............................. JP2017-235726

(51) Int. Cl.
*H01G 4/248* (2006.01)
*H01G 4/30* (2006.01)
(Continued)

(52) U.S. Cl.
CPC ........... *H01G 4/248* (2013.01); *H01G 4/0085* (2013.01); *H01G 4/012* (2013.01); *H01G 4/2325* (2013.01); *H01G 4/30* (2013.01); *H01G 4/1227* (2013.01)

(58) Field of Classification Search
CPC ...... H01G 4/248; H01G 4/012; H01G 4/1209; H01G 4/232; H01G 4/30; H01G 4/0085;
(Continued)

(56) References Cited

U.S. PATENT DOCUMENTS

2003/0016484 A1 1/2003 Iwaida et al.
2011/0253436 A1 10/2011 Hasegawa et al.
(Continued)

FOREIGN PATENT DOCUMENTS

CN 1423288 A 6/2003
CN 1308978 C 4/2007
(Continued)

OTHER PUBLICATIONS

A First Office Action issued by the State Intellectual Property Office of China dated Apr. 26, 2021, for Chinese counterpart application No. 201811493730.4 (8 pages).
(Continued)

*Primary Examiner* — Michael P McFadden
(74) *Attorney, Agent, or Firm* — Law Office of Katsuhiro Arai (57) ABSTRACT

A ceramic electronic device includes: a multilayer chip including a multilayer structure and cover layers, the multilayer structure having a structure in which each of a plurality of dielectric layers and each of a plurality of internal electrode layers are alternately stacked and are alternately exposed to two edge faces of the multilayer chip, a main component of the plurality of dielectric layers being a ceramic, the cover layers being provided on an upper face and a lower face of the multilayer structure in a stacking direction; and a pair of external electrodes that are formed on the two edge faces, wherein each of the external electrodes has a smaller thickness on a corner portion of the cover layers, has a crook toward the internal electrode layers, and has a larger thickness on an area of the two edge faces where the internal electrode layers are extracted.

12 Claims, 6 Drawing Sheets

(51) Int. Cl.
*H01G 4/232* (2006.01)
*H01G 4/008* (2006.01)
*H01G 4/012* (2006.01)
*H01G 4/12* (2006.01)

(58) Field of Classification Search
CPC .... H01G 4/1227; H01G 4/2325; H01G 4/065; H01G 4/005; H01G 4/12; H01G 4/181
See application file for complete search history.

(56) References Cited

U.S. PATENT DOCUMENTS

| | | | |
|---|---|---|---|
| 2012/0019982 A1 | 1/2012 | Sasaki | |
| 2013/0242457 A1 | 9/2013 | Lee et al. | |
| 2015/0075853 A1* | 3/2015 | Lee | H01G 4/232 174/260 |
| 2015/0287532 A1* | 10/2015 | Abe | H01G 4/232 174/260 |
| 2016/0196922 A1* | 7/2016 | Omori | H01G 4/2325 361/301.4 |
| 2017/0098505 A1* | 4/2017 | Ando | H01G 4/232 |
| 2017/0125167 A1 | 5/2017 | Kawakami et al. | |

FOREIGN PATENT DOCUMENTS

| | | |
|---|---|---|
| CN | 1949420 A | 4/2007 |
| CN | 102254685 A | 11/2011 |
| CN | 103310977 A | 9/2013 |
| CN | 107026017 A | 8/2017 |
| JP | H1022164 A | 1/1998 |
| JP | 2005044903 A | 2/2005 |
| JP | 2005159037 A | 6/2005 |
| JP | 2009184841 A | 8/2009 |
| JP | 2012044151 A | 3/2012 |
| JP | 2013012688 A | 1/2013 |
| JP | 2014116501 A | 6/2014 |

OTHER PUBLICATIONS

A Notice of Reasons for Refusal issued by the Japanese Patent Office, dated Sep. 14, 2021, for Japanese counterpart application No. 2017-235726. (3 pages).

* cited by examiner

CERAMIC ELECTRONIC DEVICE AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2017-235726, filed on Dec. 8, 2017, the entire contents of which are incorporated herein by reference.

FIELD

A certain aspect of the present invention relates to a ceramic electronic device and a manufacturing method of a ceramic electronic device.

BACKGROUND

A ceramic electronic device such as a multilayer ceramic capacitor has a multilayer chip in which a plurality of dielectric layers of which a main component is ceramic and a plurality of internal electrode layers are alternately stacked. The internal electrode layers are extracted to an edge face of the multilayer chip. An external electrode covers the surface of the edge face. For example, sheets for the multilayer chip and a paste for the external electrode are fired together with each other (for example, see Japanese Patent Application Publication No. 2005-44903).

SUMMARY OF THE INVENTION

In this case, a crack may occur in a part of a dielectric body under an external electrode in a corner portion (edge part), after the firing. The paste for the external electrode includes ceramic powders as a co-material in order to improve adhesiveness between the external electrode and the dielectric body and reduce a difference between contraction of the external electrode and contraction of the dielectric body. For example, it is possible to suppress the crack by changing an amount of the co-material or a type of the co-material. However, when the amount of the co-material is large, it is difficult to perform a plating process. And other problems also may occur.

And so, it is thought that a thickness of the paste for the external electrode is reduced on the edge part and stress during the firing is reduced. However, in this case, the thickness of the external electrode also gets smaller on the edge face of the multilayer chip. And reliability may be degraded.

The present invention has a purpose of providing a ceramic electronic component and a manufacturing a ceramic electronic component that are capable of securing reliability and suppressing crack.

According to an aspect of the present invention, there is provided a ceramic electronic device including: a multilayer chip including a multilayer structure and cover layers and having a parallelepiped shape, the multilayer structure having a structure in which each of a plurality of dielectric layers and each of a plurality of internal electrode layers are alternately stacked and are alternately exposed to two edge faces of the multilayer chip, a main component of the plurality of dielectric layers being a ceramic, the cover layers being provided on an upper face and a lower face of the multilayer structure in a stacking direction; and a pair of external electrodes that are formed on the two edge faces, wherein each of the external electrodes has a smaller thickness on a corner portion of the cover layers, has a crook toward the internal electrode layers, and has a larger thickness on an area of the two edge faces where the internal electrode layers are extracted.

According to another aspect of the present invention, there is provided a manufacturing method of a ceramic electronic device including: forming a ceramic multilayer structure having a parallelepiped shape, by stacking a plurality of pattern-formed sheets in each of which a conductive paste for forming internal electrode layers is printed on a part of a dielectric green sheet including ceramic, a margin paste including ceramic is printed on another part of the dielectric green sheet where the conductive paste for forming internal electrode layers is not printed, each of a plurality of conductive pastes for forming internal electrode layers being alternately exposed to two edge faces of the ceramic multilayer structure, and by providing cover sheets on an upper face and a lower face of the ceramic multilayer structure in a stacking direction of the ceramic multilayer structure; coating a conductive paste for forming external electrodes from the two edge faces to the cover sheets; forming dielectric layers, internal electrode layers, cover layers and external electrodes from the dielectric green sheets, the conductive pastes for forming internal electrode layers, the cover sheets and the conductive pastes for forming external electrodes by firing the ceramic multilayer structure and the conductive paste for forming external electrodes; decreasing a thickness of a part of the external electrode on a corner portion of the cover layer, making a crook of the external electrode toward the internal electrode layers, and increasing a thickness of another part of the external electrode on an area of the two edge faces where the internal electrode layers are extracted, by adjusting a difference between wettability of an area of the two edge faces where the conductive paste for forming internal electrode layers is provided and wettability of a corner portion of the cover sheet.

DETAILED DESCRIPTION

A description will be given of an embodiment with reference to the accompanying drawings.

EMBODIMENT

Figure 1:
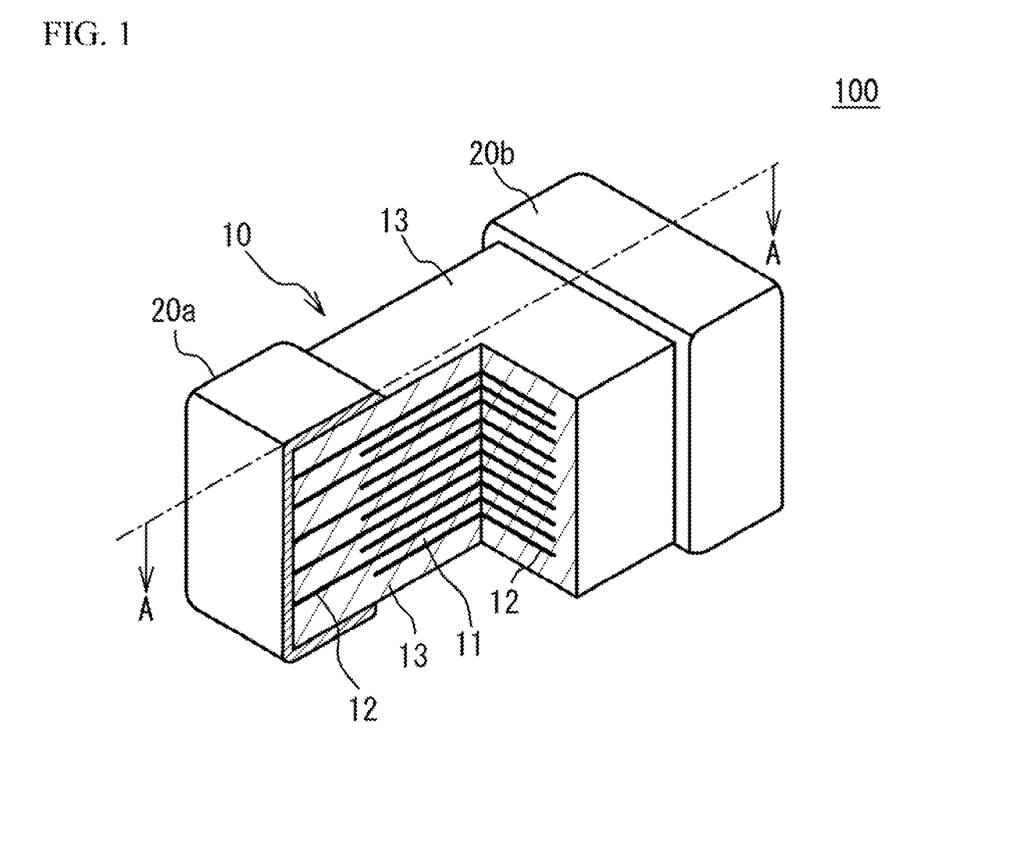
FIG. 1 illustrates a partial perspective view of a multilayer ceramic capacitor.

A description will be given of a multilayer ceramic capacitor. FIG. 1 illustrates a partial perspective view of a multilayer ceramic capacitor 100 in accordance with an embodiment. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. An upper face of the multilayer chip 10 in a stacking direction is referred to as an upper face. A lower face of the multilayer chip 10 in the stacking direction is referred to as a lower face. Two faces other than the two edge faces, the upper face and the lower face of the multilayer chip 10 are referred to as side faces. The external electrodes 20a and 20b extend to the upper face, the lower face and the two side faces. However, the external electrodes 20a and 20b are spaced from each other on the upper face, the lower face and the two side faces.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, cover layers 13 cover the upper face and the lower face of the multilayer chip 10. A main component of the cover layer 13 is a ceramic material. For example, a main component material of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

The external electrodes 20a and 20b are formed by coating a conductive metal paste on the two edge faces of the multilayer chip 10 before firing and firing the conductive metal paste together with the multilayer chip 10. However, there is a difference between a thermal expansion coefficient of the multilayer chip 10 and a thermal expansion coefficient of the external electrodes 20a and 20b. Due to the difference of the thermal expansion coefficients, stress tends to be concentrated to a corner portion (edge part) of the multilayer chip 10.

Figure 2:
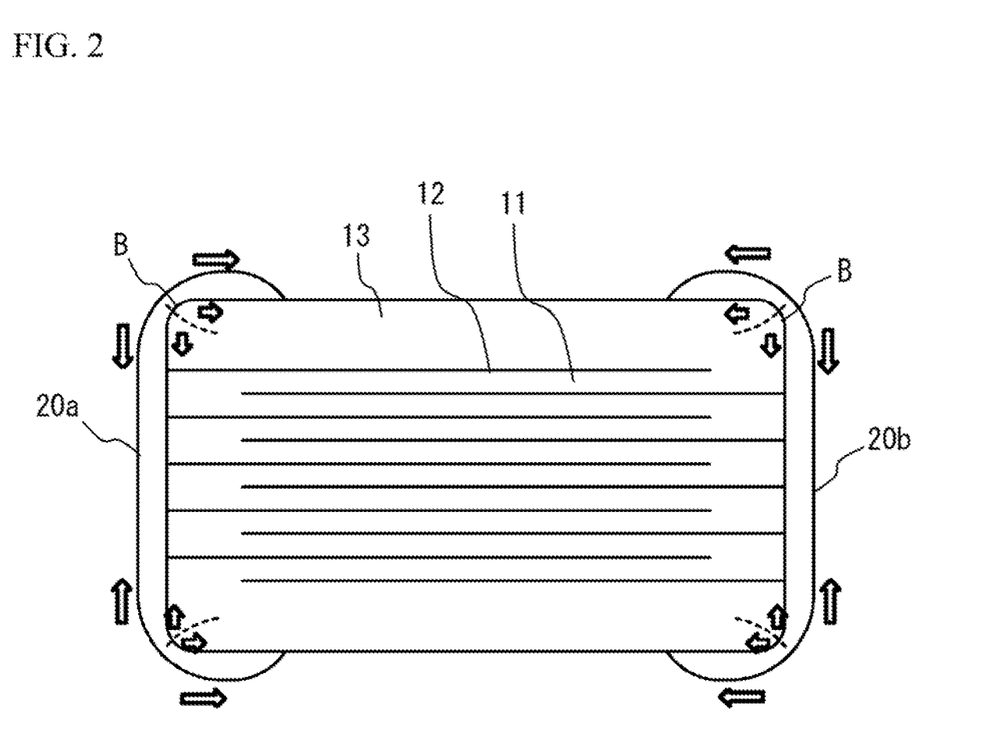
FIG. 2 illustrates a crack.

As illustrated in FIG. 2, the external electrodes 20a and 20b contract in an edge part B along a large arrow direction. In this case, the stress tends to be concentrated to the edge part B of the cover layer 13 along a small arrow direction. Due to the stress, a crack may occur as indicated by a dotted line of FIG. 2. When the crack occurs, poor appearance or reliability degradation may occur in the multilayer ceramic capacitor 100. And so, the multilayer ceramic capacitor 100 in the embodiment has a structure in which the stress applied to the edge part B is released. The edge part is a part of the corner of the multilayer chip 10 (a corner of the cover layer 13) and has a curvature.

Figure 3A:
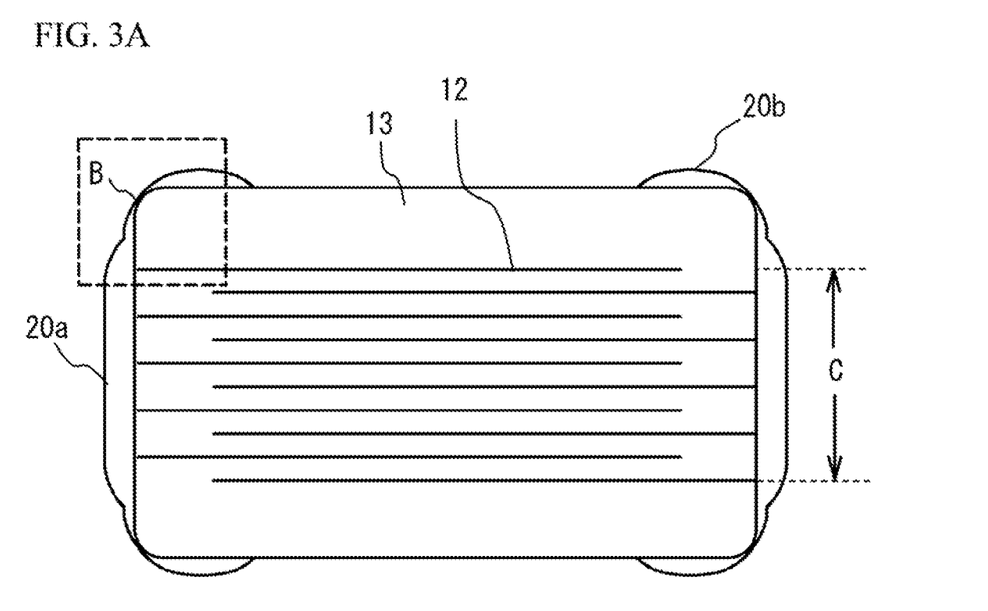
FIG. 3A illustrates a cross section taken along a line A-A of FIG. 1.

As illustrated in FIG. 3A, in the edge face of the multilayer chip 10, a region from the lowermost internal electrode layer 12 to an uppermost internal electrode layer 12 is facing region C in which the internal electrodes face with each other. FIG. 3A illustrates a cross section taken along a line A-A of FIG. 1. The edge part B is formed in the cover layer 13. Therefore, the facing region C has an approximately plane shape. The external electrodes 20a and 20b of the embodiment cover the edge part B and have a thin thickness. In this case, the stress applied to the edge part B is released. It is therefore possible to suppress the crack. However, an amount of solid material of the conductive metal paste for external electrode is reduced or a viscosity of the conductive metal paste is reduced in order to reduce the thickness of the external electrodes 20a and 20b on the edge part B, the external electrodes 20a and 20b on the edge face of the multilayer chip 10 is also reduced. In this case, an amount of the external electrode covering the facing region C is reduced. And the reliability may be degraded because of intrusion of plating solution or the like. And so, the external electrodes 20a and 20b have a large thickness on the facing region C. It is therefore possible to secure the reliability and suppress the crack.

Figure 3B:
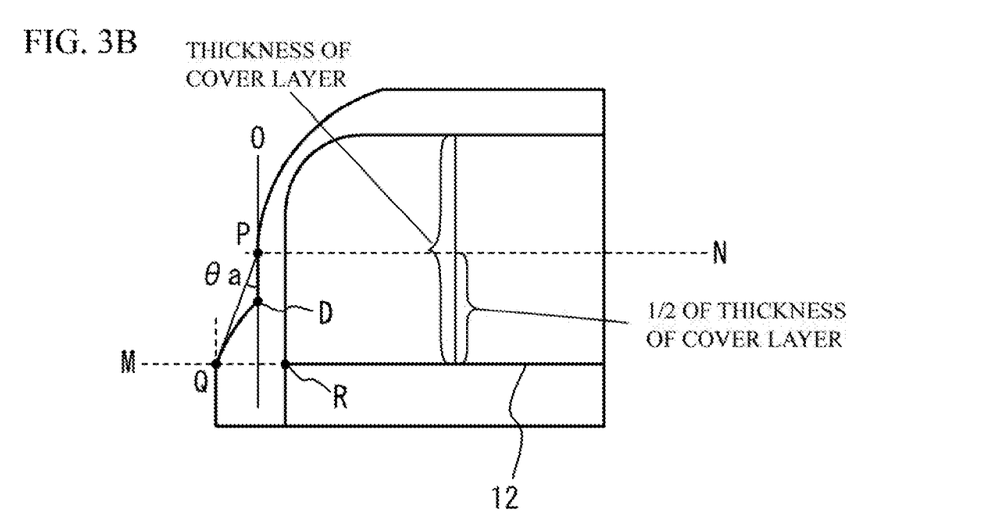
FIG. 3B illustrates an enlarged view of a broken line of FIG. 3A.

FIG. 3B illustrates details of the shape of the external electrode 20a and is an enlarged view of a broken line of FIG. 3A. In FIG. 3B, the shape of the external electrode 20a is described. The external electrode 20b has the same shape as the external electrode 20a. As illustrated in FIG. 3B, the external electrode 20a is formed from the side face of the multilayer chip 10 to the approximately plane portion of the cover layer 13 via the edge part B of the cover layer 13. The thickness of the external electrode 20a gets larger from an inflection point D. The thickness of the external electrode 20a is large on the facing region C. That is, the thickness of the external electrode 20a is small on the edge part B of the cover layer 13, has a crook (level difference) at the inflection point D and gets larger from the inflection point D. The inflection point D is positioned at the approximately plane portion that is lower than the edge part B of the cover layer 13. Thus, the thickness of the external electrode 20a is small on the edge part B. The thickness of the external electrode 20a is large on the facing region C.

The cross section of FIG. 3A in the stacking direction is a cross section along a longitudinal direction of the internal electrode layer 12 as illustrated in FIG. 1 and passes through a center of the width direction of the internal electrode layer 12. A straight line that passes through a position of ½ of the thickness of the cover layer 13 and is parallel with a flat portion of the internal electrode layer 12 next to the cover layer 13 is a straight line N. A point where the straight line N crosses the surface of the external electrode 20a is a point P. A line that passes through the point P and is parallel with an interface between the facing region C and the external electrode 20a is a straight line O. An intersection between one of the internal electrode layers 12 next to the cover layer 13 and the edge face of the multilayer chip 10 is a point R. A straight line M that extends from the point R and is parallel with the straight line N is a straight line M. A point where the straight line M crosses the surface of the external electrode 20a is a point Q. In this case, an angle between a straight line connecting the point P and the point Q and the straight line O is θa.

It is preferable that the inflection point D is positioned between the straight line M and the straight line N. That is, it is preferable that the crook formed by the inflection point D is positioned between the outermost internal electrode layer 12 and the position of a half of the thickness of the cover layer 13 next to the outermost internal electrode layer 12. In this case, it is possible to sufficiently reduce the thickness of the external electrode 20a on the edge part B.

The part of the external electrode 20a on the edge part B is thin, the external electrode 20a has a crook and the part of the external electrode 20a on the facing region C is thick, when the angle θa is larger than zero. When the angle θa is small, the thickness of the external electrode 20a gradually decreases from the edge face of the multilayer chip 10 to the edge part B. When the angle θa is excessively small, the part of the external electrode 20a on the edge part B is not sufficiently thin or the part of the external electrode 20a on the facing region C is not sufficiently thick. It is therefore preferable that the angle θa has a lower limit. On the other hand, when the angle θa is large, the thickness of the external electrode 20a rapidly decreases from the edge face of the multilayer chip 10 to the edge part B. The part of the external electrode 20a on the edge part B is excessively thin or the part of the external electrode 20a on the facing region C is excessively thick, when the angle θa is excessively large. It is therefore preferable that the angle θa has an upper limit. And so, in the embodiment it is preferable that the angle θa is 5° or more and 15° or less. It is more preferable that the angle θa is 10° or more and 15° or less.

When the part of the external electrode 20a on the edge part B is excessively thin, breaking (discontinuity of the external electrode) may occur in the edge part B. In this case, bonding of the plated layer may be degraded or humidity resistance may be degraded. And so, it is preferable that a minimum thickness of the part of the external electrode 20a on the edge part B is 1 μm or more. It is more preferable that the minimum thickness is 3 μm or more.

When the part of the external electrode 20a on the facing region C is excessively thick, the size of the multilayer ceramic capacitor 100 may be over a standard size. And so, it is preferable that the thickness of the part of the external electrode 20a on the facing region C is 30 μm or less. It is more preferable that the thickness is 25 μm or less.

The structure of the embodiment has large effect in the structure in which the cover layer 13 has a large thickness. For example, when the thickness of the cover layer 13 is ½ or more of the thickness of the facing region C, the structure of the embodiment has large effect.

A main component of the eternal electrodes 20a and 20b is a metal such as Cu, Ni, Al (aluminum) or Zn (zinc). Alternatively the main component of the external electrodes 20a and 20b is an alloy of the metals (for example, an alloy of Cu and Ni). The external electrodes 20a and 20b include ceramic such as a glass component for densifying the external electrodes 20a and 20b or a co-material for controlling sinterability of the external electrodes 20a and 20b. The glass is an oxide of Ba (barium), Sr (strontium), Ca (calcium), Zn (zinc), Al, Si (silicon), B (boron) or the like. The co-material is a ceramic component of which a main component is the same as that of the dielectric layers 11.

Figure 4:
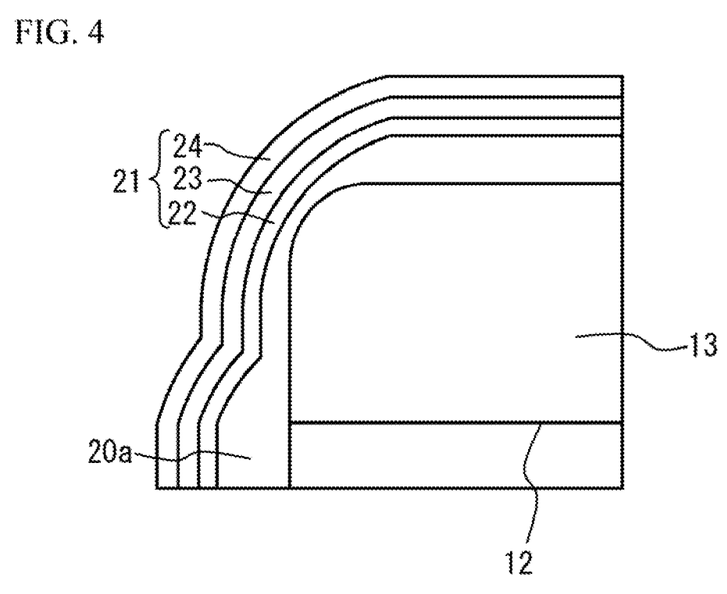
FIG. 4 illustrates a plated layer.

As illustrated in FIG. 4, a plated layer 21 may be formed on the surface of the external electrode 20a. A main component of the plated layer 21 is a metal such as Cu, Ni, Al, Zn, Sn or an alloy of them. The plated layer 21 may be a plated layer of a single metal component or may include a plurality of plated layers having a different metal. For example, the plated layer 21 has a structure in which a first plated layer 22, a second plated layer 23 and a third plated layer 24 are formed on the external electrode 20a in this order. The external electrode 20a and the plated layer 21 cover both of the edge faces of the multilayer chip 10 and extend to at least one of the four side faces of the multilayer chip 10. In the embodiment, the external electrode 20a and the plated layer 21 extend to the four side faces from both of the edge faces of the multilayer chip 10. The first plated layer 22 is, for example, a Cu-plated layer. The second plated layer 23 is, for example, a Ni-plated layer. The third plated layer 24 is, for example, a Sn-plated layer. In FIG. 4, the external electrode 20a is illustrated. The external electrode 20b has the same structure as the external electrode 20a.

Figure 5:
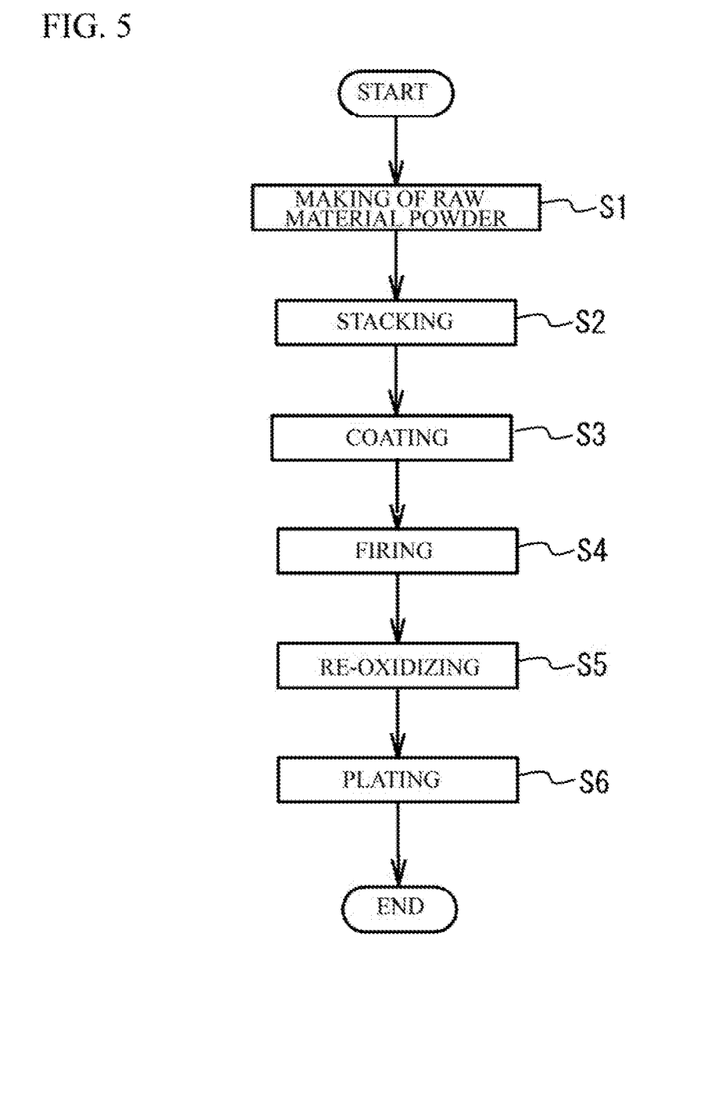
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of a raw material powder) Additive compound may be added to a ceramic powder material that is the main component of the dielectric layers 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B, Na (sodium), K (potassium) and Si, or glass. Compound including additive compound is mixed with the ceramic material powders. The resulting ceramic powders are calcined. Then, the ceramic powders are wet-blended with the additive compound. After that, the ceramic powders with the additive compound are dried and crushed. And, desirable ceramic powder is prepared.

(Stacking Process) Next, a binder such as polyvinyl butyral (PVB) resin, an organic solvent such as ethanol or toluene, and a plasticizer are added to the resulting dielectric material and are wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing conductive pastes for forming an internal electrode with use of screen printing or gravure printing. The conductive pastes include powders of a main component metal of the internal electrode layers 12, a binder, a solvent and additives if necessary. It is preferable that the binder and the solvent are different from those of the ceramic slurry. The ceramic material that is the main component of the dielectric layers 11 and acts as the co-material may be dispersed into the conductive paste. Next, a binder such as polyvinyl butyral (PVB) resin, an organic solvent such as ethanol or toluene, and a plasticizer are added to the resulting ceramic material made in the making process of a raw material powder and are wet-blended. With use of the resulting slurry as a margin paste, a reverse pattern is printed on the dielectric green sheet where the conductive paste for forming an internal electrode is not printed. Thus, a pattern-formed sheet is formed.

Then, the pattern-formed sheet is stamped into a predetermined size, and a predetermined number (for example, 200 to 500) of stamped pattern-formed sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are stacked on the stacked pattern-formed sheets and under the stacked sheets and are thermally compressed. The resulting compact is cut into a predetermined size (for example, 1.0 mm×0.5 mm). Thus, a ceramic multilayer structure having a parallelepiped shape is formed. It is possible to form the cover sheets for adding a binder such as polyvinyl butyral (PVB) resin, an organic solvent such as ethanol or toluene, and a plasticizer to the resulting ceramic material made in the making process of a raw material powder and wet-blending the materials and printing the wet-blended materials.

The above-mentioned angle θa is a function determined on the basis of a difference between the wettability of the facing region C and the wettability of the edge part B. And so, the amount of the binder on the edge face of the multilayer chip 10 may be adjusted. The amount of the binder is volume % or weight % with respect to the cover sheet, the margin paste or the dielectric green sheet. For example, a part of the edge face to which the binder is exposed has high wettability with respect to the conductive paste for forming an external electrode. Therefore, on the part to which the binder is exposed, the conductive metal paste has a small thickness. And so, the amounts of the binder of the cover sheet and the margin paste may be larger than that of the dielectric green sheet. Alternatively, the binder may be bonded to the edge part B. Alternatively, it is possible to increase the wettability of the edge part B by a plasma process with use of a mask or the like. And it is possible to decrease the wettability of the facing region C by the plasma process with use of the mask or the like.

(Coating process) After that, a conductive metal paste for the external electrode including the co-material is coated on the both edge faces of the ceramic multilayer structure by a dipping method or the like. It is possible to adjust the thickness of the conductive metal paste by diluting the conductive metal paste.

(Firing process) After that, the binder is removed from the ceramic multilayer structure in $N_2$ atmosphere of 250 degrees C. to 500 degrees C. The resulting ceramic multilayer is fired for 10 minutes to 2 hours in a reductive atmosphere in a temperature range of 1100 degrees C. to 1300 degrees C. Thus, each compound structuring the dielectric green sheet is sintered. Each compound structuring the pattern for the internal electrode is sintered. Each compound structuring the conductive metal paste for the external electrode is sintered. Each compound structuring the cover sheet is sintered. And a grains of each compound grows. In this manner, the multilayer ceramic capacitor 100 having the multilayer chip 10 in which the sintered dielectric layer 11 and the sintered internal electrode layers 12 are alternately stacked and the cover layers 13 are formed as outermost layers in the stacking direction is obtained.

(Re-oxidizing process) After that, the sintered structure may be subjected to a re-oxidizing process in $N_2$ gas atmosphere in a temperature range of 600 degrees C. to 1000 degrees C.

(Plating process) After that, with a plating process, the plated layer 21 is formed on the external electrodes 20a and 20b. For example, the first plated layer 22, the second plated layer 23 and the third plated layer 24 are formed in third order.

In the manufacturing method of the embodiment, the thickness of the external electrodes 20a and 20b is small on the edge part B. In this case, the stress applied to the edge part B is suppressed. It is therefore possible to suppress the occurrence of the crack. And, the thickness of the external electrodes 20a and 20b is large on the facing region C. It is therefore possible to secure the reliability. In the manufacturing method of the embodiment, it is therefore possible to secure the reliability and suppress the occurrence of the crack.

It is preferable that the above-mentioned angle θa is adjusted to 5° or more and 15° or less by adjusting the difference between the wettability of the facing region C and the wettability of the edge part B. It is more preferable that the angle θa is adjusted to 10° or more and 15° or less.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Examples 1 to 10

Necessary additive was added to barium titanate powders. The resulting powders were sufficiently wet-blended by a ball mil and were crushed. Thus, the dielectric material was obtained. An organic binder and a solvent were added to the dielectric material. And dielectric green sheets were made by a doctor blade method. The organic binder was polyvinyl butyral (PVB) resin or the like. The solvent was ethanol, toluene or the like. And a plasticizer and so on were added.

Next, the conductive paste for forming the internal electrode layer was formed. The conductive paste included a main component metal (Ni) powder of the internal electrode layer 12, a co-material (barium titanate), a binder (ethyl cellulose), a solvent and an auxiliary as needed.

The conductive paste for forming the internal electrode layer was screen-printed on the dielectric green sheet. The margin paste including the dielectric material was printed on the dielectric green sheet where the conductive paste for forming the internal electrode layer is not formed. Thus, the patter-formed sheet was made. The amount of the binder in the margin paste was larger than that of the dielectric green sheet. The base was peeled from the pattern-formed sheet. And, the pattern-formed sheets were stacked. And cover sheets were stacked on the stacked pattern-formed sheets and under the stacked pattern-formed sheets. After that, a ceramic multilayer structure was obtained by a thermal compressing. And the ceramic multilayer structure was cut into a predetermined size. The amount of the binder in the cover sheet was larger than that of the dielectric green sheet.

The binder was removed from the ceramic multilayer structure in $N_2$ atmosphere of 250 degrees C. to 500 degrees C. After that, the metal paste including the metal filler of which a main component was Ni, the co-material, the binder and the solvent was coated from the both edge faces to the side faces of the ceramic multilayer structure and was dried. The thickness of the external electrodes 20a and 20b was 10 μm in the examples 1 and 2. The thickness of the external electrodes 20a and 20b was 15 μm in the examples 3 and 4. The thickness of the external electrodes 20a and 20b was 20 μm in the examples 5 and 6. The thickness of the external electrodes 20a and 20b was 25 μm in the examples 7 and 8. The thickness of the external electrodes 20a and 20b was 30 μm in the examples 9 and 10. The thickness of the external electrodes 20a and 20b was 35 μm in the examples 11 and 12. After that, the resulting ceramic multilayer structure was fired together with the metal paste in a reductive atmosphere of $10^{-5}$ atm to $10^{-8}$ atm in a temperature range of 1100 degrees C. to 1300 degrees C. And, a sintered structure was formed. 25 samples were made with respect to each of the examples 1 to 12. 100 data including four points of each sample were obtained.

The size of the sintered structure of the examples 1 and 2 was the length of 1600 μm, the width of 800 μm, and the height of 800 μm. The size of the sintered structure of the examples 3 and 4 was the length of 2000 μm, the width of 1250 μm, and the height of 1250 μm. The size of the sintered structure of the examples 5 and 6 was the length of 3200 μm, the width of 1600 μm, and the height of 1600 μm. The size of the sintered structure of the examples 7 and 8 was the length of 3200 μm, the width of 2500 μm, and the height of 2500 μm. The size of the sintered structure of the examples 9 and 10 was the length of 4500 μm, the width of 3200 μm, and the height of 2500 μm. The thickness of the cover layer 13 was 80 μm in the example 1. The thickness of the cover layer was 240 μm in the example 2. The thickness of the cover layer was 125 μm in the example 3. The thickness of the cover layer was 375 μm in the example 4. The thickness of the cover layer was 160 μm in the example 5. The thickness of the cover layer was 480 μm in the example 6. The thickness of the cover layer was 250 μm in the example 7. The thickness of the cover layer was 750 μm in the example 8. The thickness of the cover layer was 250 μm in the example 9. The thickness of the cover layer was 750 μm in the example 10.

Figure 6A:
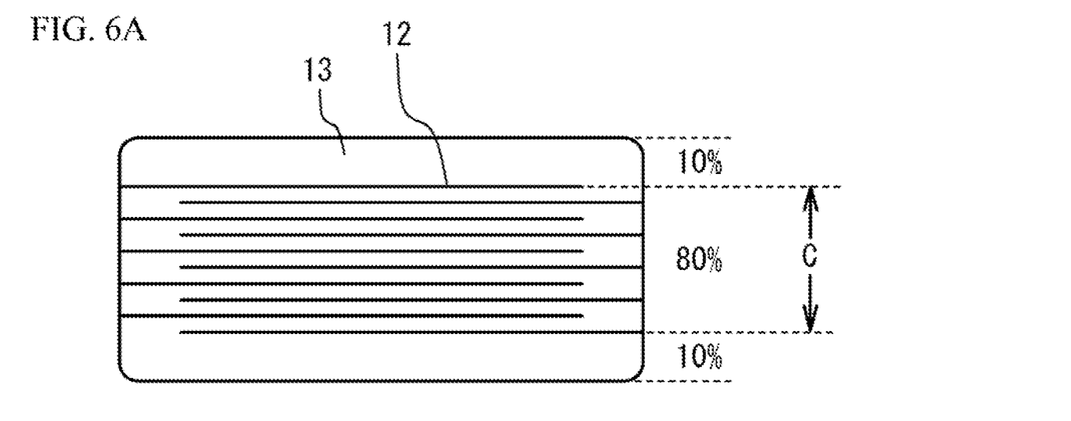
FIG. 6A and FIG. 6B illustrate a thickness of a cover layer.
Figure 6B:
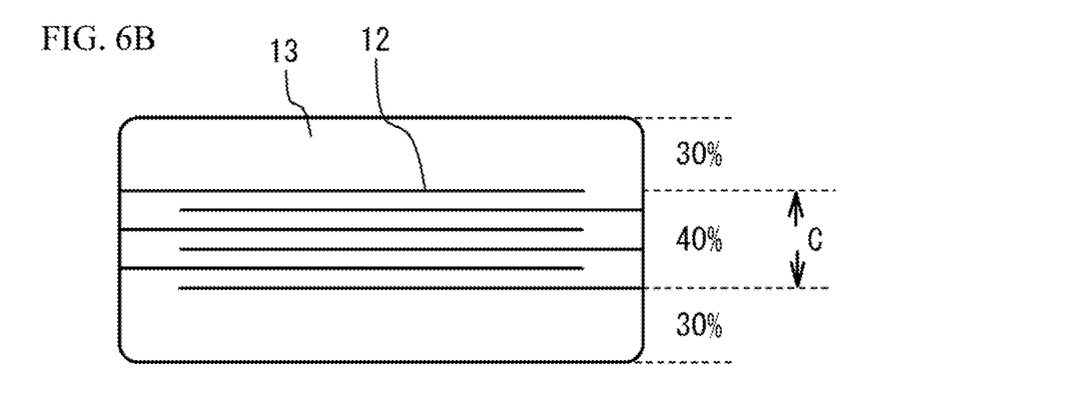

In the examples 1, 3, 5, 7 and 9, as illustrated in FIG. 6A, the thickness of the upper cover layer 13 and the lower cover layer 13 was 10% of the height of the multilayer chip 10, and the thickness of the facing region C was 80% of the height of the multilayer chip 10. In the examples 2, 4, 6, 8 and 10, as illustrated in FIG. 6B, the thickness of the upper cover layer 13 and the lower cover layer 13 was 30% of the height of the multilayer chip 10. The thickness of the facing region C was 40% of the height of the multilayer chip 10.

The angle θa was 15.0° in the example 1. The angle θa was 6.0° in the example 2. The angle θa was 13.7° in the example 3. The angle θa was 5.4° in the example 4. The angle θa was 12.7° in the example 5. The angle θa was 5.0° in the example 6. The angle θa was 14.6° in the example 7. The angle θa was 5.7° in the example 8. The angle θa was 12.7° in the example 9. The angle θa was 5.0° in the example 10. The angle θa was 15.0° in the example 11. The angle θa was 6.0° in the example 12.

Comparative Examples 1 to 5

In a comparative example 1, the angle θa was 0° and other conditions were the same as those of the example 2. In a comparative example 2, the angle θa was 0° and other conditions were the same as those of the example 4. In a comparative example 3, the angle θa was 0° and other conditions were the same as those of the example 6. In a comparative example 4, the angle θa was 0° and other conditions were the same as those of the example 8. In a comparative example 5, the angle θa was 0° and other conditions were the same as those of the example 10. In order to achieve the angle θa=0°, the amount of the binder in the cover sheet and the amount of the binder in the dielectric green sheet were adjusted.

(Analysis) A crack occurrence rate of each sample of the examples 1 to 10 and the comparative examples 1 to 5 was measured by observing occurrence of the crack of the cover layer 13 on the edge part B. Table 1 shows measured results. As shown in Table 1, in the comparative examples 1 to 5, the crack occurred. On the other hand, in any of the examples 1 to 10, the occurrence rate was 0%. It is thought that this was because the angle θa was larger than 0, the thickness of the external electrodes 20a and 20b was small on the edge part B, and the thickness of the external electrodes 20a and 20b was large on the facing region C. In the examples 2, 4, 6, 8, 10 and the comparative examples 1 to 5, the thickness of the cover layer 13 was ½ or more of the thickness of the facing region C. From the results, the occurrence of the corner crack was suppressed when the thickness of the cover layer 13 was ½ or more of the thickness of the facing region C.

TABLE 1

| | SIZE | | | THICKNESS OF COVER (μm) | DESIGNED THICKNESS ON EDGE FACE (μm) | θa (DEGREE) | CORNER CRACK OCCURRENCE RATE |
|---|---|---|---|---|---|---|---|
| | LENGTH (μm) | WIDTH (μm) | HEIGHT (μm) | | | | |
| EXAMPLE 1 | 1600 | 800 | 800 | 80 | 15 | 13.7 | 0% |
| EXAMPLE 2 | 1600 | 800 | 800 | 240 | 15 | 5.4 | 0% |
| EXAMPLE 3 | 2000 | 1250 | 1250 | 125 | 20 | 12.7 | 0% |
| EXAMPLE 4 | 2000 | 1250 | 1250 | 375 | 20 | 5.0 | 0% |
| EXAMPLE 5 | 3200 | 1600 | 1600 | 160 | 25 | 14.6 | 0% |
| EXAMPLE 6 | 3200 | 1600 | 1600 | 480 | 25 | 5.7 | 0% |
| EXAMPLE 7 | 3200 | 2500 | 2500 | 250 | 30 | 12.7 | 0% |
| EXAMPLE 8 | 3200 | 2500 | 2500 | 750 | 30 | 5.0 | 0% |
| EXAMPLE 9 | 4500 | 3200 | 2500 | 250 | 35 | 15.0 | 0% |
| EXAMPLE 10 | 4500 | 3200 | 2500 | 750 | 35 | 6.0 | 0% |
| COMPARATIVE EXAMPLE 1 | 1600 | 800 | 800 | 240 | 15 | 0.0 | 2% |
| COMPARATIVE EXAMPLE 2 | 2000 | 1250 | 1250 | 375 | 20 | 0.0 | 5% |

TABLE 1-continued

| | SIZE | | | THICKNESS OF COVER (μm) | DESIGNED THICKNESS ON EDGE FACE (μm) | θa (DEGREE) | CORNER CRACK OCCURRENCE RATE |
|---|---|---|---|---|---|---|---|
| | LENGTH (μm) | WIDTH (μm) | HEIGHT (μm) | | | | |
| COMPARATIVE EXAMPLE 3 | 3200 | 1600 | 1600 | 480 | 25 | 0.0 | 10% |
| COMPARATIVE EXAMPLE 4 | 3200 | 2500 | 2500 | 750 | 30 | 0.0 | 20% |
| COMPARATIVE EXAMPLE 5 | 4500 | 3200 | 2500 | 750 | 35 | 0.0 | 30% |

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip comprising a multilayer structure and cover layers and having a parallelepiped shape, the multilayer structure having a structure in which each of a plurality of dielectric layers and each of a plurality of internal electrode layers are alternately stacked, the plurality of internal electrode layers being alternately exposed to two edge faces of the multilayer chip, a main component of the plurality of dielectric layers being a ceramic, the cover layers being provided on an upper face and a lower face of the multilayer structure in a stacking direction; and
a pair of external electrodes that are formed on the two edge faces,
wherein each of the external electrodes has a smaller thickness on a corner portion of the cover layers, has a crook toward the internal electrode layers, and has a larger thickness on an entire area of the two edge faces where the internal electrode layers are extracted than on any other areas of the two edge faces,
wherein each of the external electrodes is constituted solely by a conductive portion that is conductive together with the internal electrode layers,
wherein an angle θa is 5° or more and 15° or less, when a straight line parallel with the internal electrode layer next to the cover layer is a first straight line, a straight line that is parallel with the internal electrode next to the cover layer and passes through a half of a thickness of the cover layer is a second straight line, a point where the second straight line crosses a surface of the external electrode is a first point, a straight line passing through the first point and parallel with an interface between an area of the edge face where the internal electrode layers are extracted and the external electrode is a third straight line, a point where the first straight line crosses the surface of the external electrode is a second point, and an angle between a straight line passing through the first point and the second point and the third straight line is the angle θa, in a cross section parallel with a direction passing through a half of a width of the internal electrode layer and parallel with a facing direction of the two edge faces.

2. The ceramic electronic device as claimed in claim 1, wherein the crook is positioned between an outermost internal electrode layer and a half of a thickness of the cover layer next to the outermost internal electrode layer.

3. The ceramic electronic device as claimed in claim 1, wherein the thickness of the cover layers is a half of the thickness of the multilayer structure or more.

4. The ceramic electronic device as claimed in claim 1, wherein a main component of the internal electrode layers and a main component of the external electrodes are the same metal as each other.

5. The ceramic electronic device as claimed in claim 1, wherein
an entire area of each of the external electrodes facing the area of the two edge faces where the internal electrode layers are extracted has a thickness of 10 μm or more.

6. A manufacturing method of a ceramic electronic device comprising: forming a ceramic multilayer structure having a parallelepiped shape, by stacking a plurality of pattern-formed sheets in each of which a conductive paste for forming internal electrode layers is printed on a part of a dielectric green sheet including ceramic, a margin paste including ceramic is printed on another part of the dielectric green sheet where the conductive paste for forming internal electrode layers is not printed, each of a plurality of conductive pastes for forming internal electrode layers being alternately exposed to two edge faces of the ceramic multiplayer structure, and by providing cover sheets on an upper face and a lower face of the ceramic multilayer structure in a stacking direction of the ceramic multilayer structure; coating a conductive paste for forming external electrodes from the two edge faces to the cover sheets; forming dielectric layers, internal electrode layers, cover layers and external electrodes from the dielectric green sheets, the conductive pastes for forming internal electrode layers, the cover sheets and the conductive pastes for forming external electrodes by firing the ceramic multilayer structure and the conductive paste for forming external electrodes; decreasing a thickness of a part of the external electrode on a corner portion of the cover layer, making a crook of the external electrode toward the internal electrode layers, and increasing a thickness of another part of the external electrode on an area of the two edge faces where the internal electrode layers are extracted, by adjusting a difference between wettability of an area of the two edge faces where the conductive paste for forming internal electrode layers is provided and wettability of a corner portion of the cover sheet, wherein each of the external electrodes has a smaller thickness on the corner portion of the cover layers has the crook toward the internal electrode layers, and has a larger thickness on an entire area of the two edge faces where the internal electrode layers are extracted than on any other areas of the two edge faces, wherein each of the external electrodes is constituted solely by a conductive portion that is conductive together with the internal electrode layers, wherein an angle θa is 5° or more and 15° or less, when a straight line parallel with the internal electrode layer next to the cover layer is a first straight line, a straight line that is parallel with internal electrode next to the cover layer and passes through a half of a thickness of the cover layer is a second straight line, a point where the second straight line crosses a surface of the external electrode is a first point, a straight line rising throw h the first point and parallel with an interface between an area of the edge face where the internal electrode layers are extracted and the external electrode is a third straight line, a point where the first straight line passing through the first point and the second point and the third straight line is the angle θa, in a cross parallel with a facing direction of the two edge faces.

7. The method as claimed in claim 6, wherein a difference between the wettability of the area of the two edge faces where the conductive past for forming internal electrode layers are provided and the wettability of the corner portion of the cover sheet is adjusted by enlarging amounts of a binder in the cover sheet and the margin paste more than an amount of a binder in the dielectric green sheets.

8. A ceramic electronic device comprising:
   a multilayer chip comprising a multilayer structure, an upper cover layer, and a lower cover layer, the multilayer chip having a parallelepiped shape, the multilayer structure having a structure in which each of a plurality of dielectric layers and each of a plurality of internal electrode layers are alternately stacked, the plurality of internal electrode layers being alternately exposed to two edge faces of the multilayer chip, a main component of the plurality of dielectric layers being a ceramic, the upper cover layer being provided on an upper face of the multilayer structure in a stacking direction; the lower cover layer being provided on a lower face, opposite to the upper face, of the multilayer structure in the stacking direction; and
   a pair of external electrodes that are formed on the two edge faces,
   wherein each of the external electrodes has a first thickness at each corner portion of an upper face of the upper and an lower face of the lower cover layers and a second thickness on and parallel with each of the upper face of the upper cover layer and the lower face of the lower cover layer, has a crook toward the internal electrode layers, and has a third thickness on an area of the two edge faces where the internal electrode layers are extracted, any value of the first thickness being smaller than any value of the second thickness and any value of the third thickness,
   wherein the third thickness is larger entirely on the area of the two edge faces where the internal electrode layers are extracted than a thickness of each of the external electrodes on any another areas of the two edge faces,
   wherein an angle θa is 5° or more and 15° or less, when a straight line parallel with the internal electrode layer next to the cover layer is a first straight line, a straight line that is parallel with the internal electrode next to the cover layer and passes through a half of a thickness of the cover layer is a second straight line, a point where the second straight line crosses a surface of the external electrode is a first point, a straight line passing through the first point and parallel with an interface between an area of the edge face where the internal electrode layers are extracted and the external electrode is a third straight line, a point where the first straight line crosses the surface of the external electrode is a second point, and an angle between a straight line passing through the first point and the second point and the third straight line is the angle θa, in a cross section parallel with a direction passing through a half of a width of the internal electrode layer and parallel with a facing direction of the two edge faces.

9. The ceramic electronic device as claimed in claim 8, wherein the crook is positioned between an outermost internal electrode layer and a half of a thickness of the cover layer next to the outermost internal electrode layer.

10. The ceramic electronic device as claimed in claim 8, wherein the thickness of the cover layers is a half of the thickness of the multilayer structure or more.

11. The ceramic electronic device as claimed in claim 8, wherein a main component of the internal electrode layers and a main component of the external electrodes are the same metal as each other.

12. The ceramic electronic device as claimed in claim 8, wherein
   an entire area of each of the external electrodes facing the area of the two edge faces where the internal electrode layers are extracted has a thickness of 10 μm or more.

* * * * *

UNITED STATES PATENT AND TRADEMARK OFFICE
CERTIFICATE OF CORRECTION

PATENT NO. : 11,164,701 B2  
APPLICATION NO. : 16/208308  
DATED : November 2, 2021  
INVENTOR(S) : Tahara et al.

Page 1 of 2

It is certified that error appears in the above-identified patent and that said Letters Patent is hereby corrected as shown below:

In the Claims

At Column 12, Line 28, in Claim 6, after the (":"), the phrase beginning with "forming" should be started in a new line.

At Column 12, Lines 37-38, in Claim 6, please delete "multiplayer" and insert therefor --multilayer--.

At Column 12, Lines 40-41, in Claim 6, after the (";"), the phrase beginning with "coating" should be started in a new line.

At Column 12, Line 42, in Claim 6, after the (";"), the phrase beginning with "forming" should be started in a new line.

At Column 12, Line 48, in Claim 6, after the (";"), the phrase beginning with "decreasing" should be started in a new line.

At Column 12, Line 57, in Claim 6, after the (","), the phrase beginning with "wherein" should be started in a new line.

At Column 12, Line 59, in Claim 6, between the word "layers" and the word "has", a --,-- should be inserted.

At Column 12, Line 60, in Claim 6, the word "lavers" should be deleted and --layers-- should be inserted therefor.

At Column 12, Lines 62-63, in Claim 6, after the (","), the phrase beginning with "wherein" should be started in a new line.

At Column 12, Line 65, in Claim 6, after the (","), the phrase beginning with "wherein" should be started in a new line.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,164,701 B2

At Column 13, Line 1, in Claim 6, between the words "with" and "internal", a word --the-- should be inserted.

At Column 13, Line 5, in Claim 6, the phrase "rising throw h" should be deleted and --passing through-- should be inserted therefor.

At Column 13, Line 9, in Claim 6, between the words "line" and "passing", a phrase --crosses the surface of the external electrode is a second point, and an angle between a straight line-- should be inserted.

At Column 13, Line 11, in Claim 6, between the words "cross" and "parallel", a word --section parallel with a direction passing through a half of a width of the internal electrode layer and-- should be inserted.